US006290384B1

United States Patent
Pozniak et al.

(10) Patent No.: US 6,290,384 B1
(45) Date of Patent: Sep. 18, 2001

(54) APPARATUS FOR PRODUCING LIQUID MIXTURE HAVING PREDETERMINED CONCENTRATION OF A SPECIFIC COMPONENT

(75) Inventors: Peter M. Pozniak, San Jose; Benjamin R. Roberts, Los Altos; Frank Jansen, Walnut Creek, all of CA (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/479,290

(22) Filed: Jan. 6, 2000

Related U.S. Application Data

(62) Division of application No. 09/198,686, filed on Nov. 24, 1998.

(51) Int. Cl.[7] ............................. B01F 15/02; G05D 11/08
(52) U.S. Cl. .................... 366/136; 366/152.4; 366/160.2
(58) Field of Search .................................. 366/132, 134, 366/136, 137, 142, 152.1, 152.4, 152.6, 153.1, 160.1–160.3, 160.5, 182.1, 182.2, 191, 192, 336–340; 137/3, 5, 93, 563

(56) References Cited

U.S. PATENT DOCUMENTS

| | | |
|---|---|---|
| 3,661,364 | 5/1972 | Lage . |
| 3,877,682 | 4/1975 | Moss . |
| 3,897,935 | 8/1975 | Forster et al. . |
| 4,251,627 | 2/1981 | Calamur . |
| 4,299,501 * | 11/1981 | Patil et al. . |
| 4,621,927 | 11/1986 | Hiroi . |
| 4,712,921 | 12/1987 | Sugiura . |
| 4,823,987 * | 4/1989 | Switall . |
| 4,844,620 | 7/1989 | Lisant et al. . |
| 4,964,732 * | 10/1990 | Cadeo et al. . |
| 5,308,160 | 5/1994 | Weiss . |
| 5,348,390 * | 9/1994 | Schertenleib . |
| 5,372,421 | 12/1994 | Pardikes . |
| 5,409,310 | 4/1995 | Owczarz . |
| 5,522,660 | 6/1996 | O'Dougherty et al. . |
| 5,688,401 | 11/1997 | Bober et al. . |
| 5,723,517 | 3/1998 | Campo et al. . |
| 5,800,056 | 9/1998 | Suzuki et al. . |
| 5,865,537 | 2/1999 | Streiff et al. . |
| 5,874,049 * | 2/1999 | Ferri, Jr. et al. . |
| 5,924,794 * | 7/1999 | O'Dougherty et al. . |
| 5,980,836 * | 11/1999 | Moffett et al. . |

* cited by examiner

Primary Examiner—Charles E. Cooley
(74) Attorney, Agent, or Firm—Joshua L. Cohen; Salvatore P. Pace

(57) ABSTRACT

A method and apparatus for producing a liquid mixture in which mixture components are mixed to produce a product stream having a predetermined connection of a specified component. This mixing occurs within a fluidic network designed such that the components mix in inlet branches to form a first intermediate mixture having a lower concentration than that desired in the product stream. The specified component is metered into the intermediate product stream to produce a second intermediate product stream that is blended to produce a third intermediate product stream. The concentration of the specified component within the third intermediate product stream is measured and the metering pump is appropriately adjusted. The third intermediate product stream then passes through a recycle loop in which recycled product is mixed with an intermediate product stream to produce a liquid mixture stream that is divided into the recycle stream and a product stream.

8 Claims, 1 Drawing Sheet

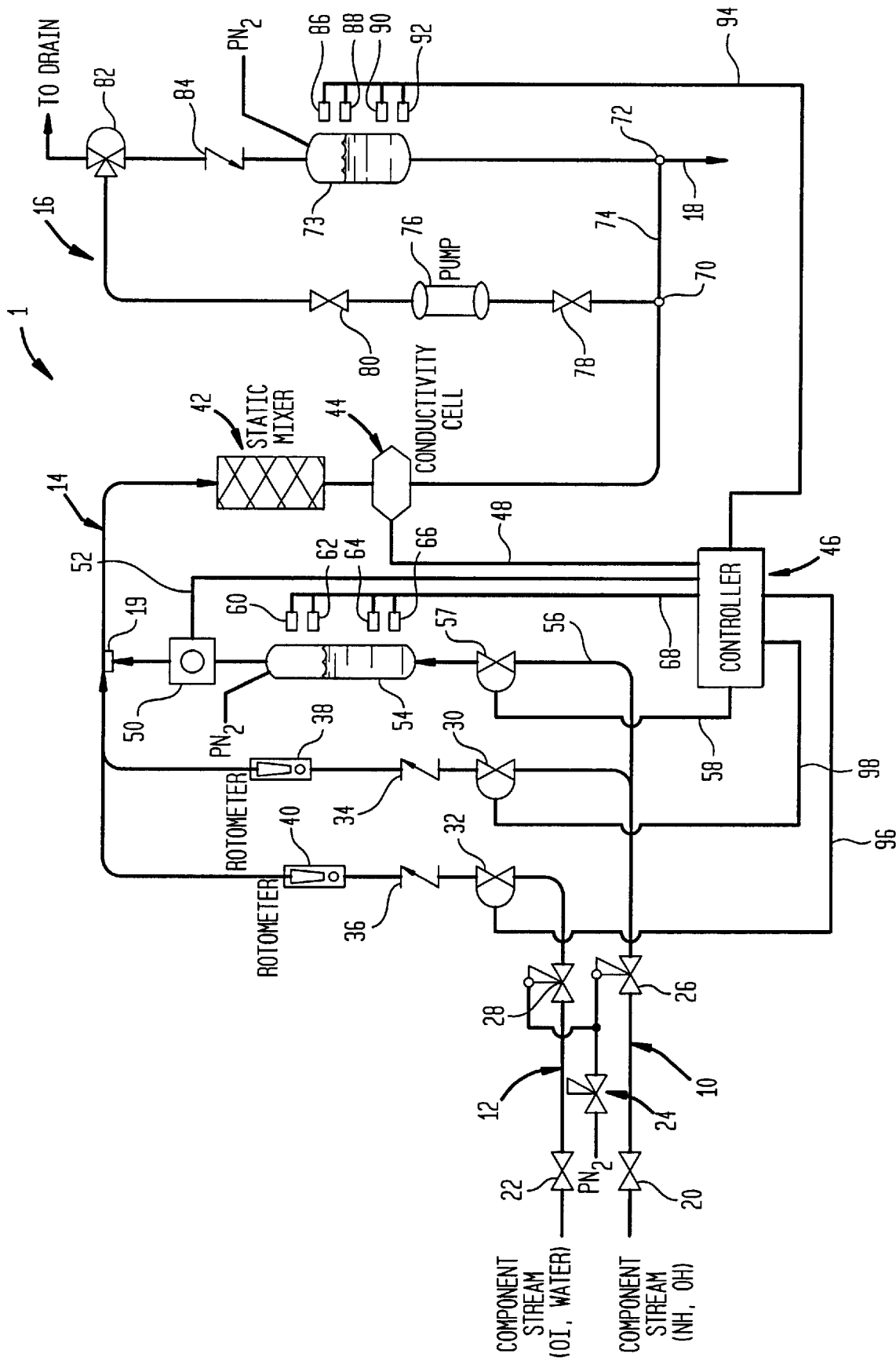

APPARATUS FOR PRODUCING LIQUID MIXTURE HAVING PREDETERMINED CONCENTRATION OF A SPECIFIC COMPONENT

RELATED APPLICATIONS

This is a division of application Ser. No. 09/198,686 filed Nov. 24, 1998.

BACKGROUND

The present invention relates to a method and apparatus for producing a liquid mixture having a pre-determined concentration of a specified component. More particularly, the present invention relates to such a method and apparatus in which component streams are mixed together to form an intermediate mixture having a lower concentration of the specified component than that desired for the mixture and a stream containing the specified component is added to such intermediate mixture so that the resultant stream has a pre-determined concentration of the specified component. Even more particularly, the present invention relates to such a method and apparatus in which part of the two component mixture is recycled to increase the homogeneity of the product.

There are many industrial processes that utilize liquid mixtures in which the concentration of the components of the mixture is particularly critical for the successful performance of the process. For example, in the manufacture of semiconductors, it is necessary that between processing steps, the wafer being processed be cleaned with an aqueous ammonia water solution.

The problem with producing such a solution with repeatable accuracy is that often the components are retrieved from bulk sources in which the components are mixed with other agents. As a result, the concentration of the components does not remain constant. For instance, in forming the aqueous ammonia solution, the ammonia component is drawn from a bulk source in the form of ammoniated water. Over time, however, the ammonia concentration within the water decreases due to the vapor pressure of the ammonia.

As will be discussed the present invention provides a method and apparatus for producing a liquid mixture with a reliably consistent concentration of the desired component.

SUMMARY OF THE INVENTION

In one aspect, the present provides a method of producing a liquid mixture having a pre-determined concentration of the specified component. In this regard, the term "mixture" as used herein and in the claims means either a suspension or a true solution. In accordance with the method, component streams are mixed together to form a first intermediate mixture stream having a lower concentration of the specified component than the pre-determined concentration. A stream containing the specified component is introduced into the first intermediate mixture stream to form a second intermediate mixture stream. The second intermediate mixture stream is then blended to produce a third intermediate mixture stream. The concentration of the third intermediate mixture stream is measured and the introduction of the stream containing the specified component is metered so that the intermediate mixture stream contains the specified component in the pre-determined concentration. A recycle stream, composed of the liquid mixture, is introduced into the intermediate stream to form a liquid mixture stream of the liquid mixture. The liquid mixture stream is divided into the recycle stream and a product stream.

In another aspect, the present invention provides an apparatus for producing a liquid mixture having a pre-determined concentration of a specified component.

The apparatus consists of a fluidic network having two inlet branches to mix component streams to form a first intermediate mixture stream having a lower concentration than the specified component of the pre-determined concentration. An intermediate branch is provided having an inlet to introduce a stream of the first component into the first intermediate mixture stream to form a second intermediate mixture stream. A means for blending the second intermediate mixture stream of the liquid mixture stream is provided to produce a third intermediate mixture. A recycle loop is also provided. The recycle loop has an inlet junction connected to the intermediate branch and an outlet junction to discharge a product stream composed of part of the liquid mixture stream. The recycle loop communicates between the outlet junction and the inlet junction, thereby to introduce a recycle stream composed of the remaining part liquid mixture into the third intermediate mixture stream to form a liquid mixture stream of the liquid mixture and to divide the liquid mixture stream into the recycle stream and a product stream. Also provided is a means for measuring the concentration of the intermediate mixture and a means for metering the introduction of the stream containing the specified component so that the first intermediate mixture stream contains the specified component in the pre-determined concentration.

As can be appreciated, since the first intermediate product stream has a lower concentration then that desired in the final mixture and the concentration is brought up in the first intermediate stream to form a second intermediate stream, the concentration of the specified component can be very accurately controlled. Since after the second intermediate stream is blended to form the third intermediate stream, the concentration is measured and used in metering the specified component, the product concentration can therefore be reliably adjusted. In order to further enhance the homogeneity of the mixture, that is to assure that there are no substantial temporal variations in concentration, the recycle loop or recycle stream can be provided so that part of the product is continually recycled into the third intermediate product stream. As a result, the variations in product concentration are very much reduced over prior art methods.

BRIEF DESCRIPTION OF THE DRAWINGS

While the specification concludes with claims distinctly pointing out the subject matter that Applicants' regard as their invention, it is believed the invention will be better understood when taken in connection with the accompanying drawings in which the sole FIGURE is a schematic representation of an apparatus used in carrying a method in accordance with the present invention.

DETAILED DESCRIPTION

With reference to the FIGURE, an apparatus 1 is illustrated for producing a liquid mixture, for instance, a mixture of ammonia and water having a predetermined concentration of the ammonia.

Apparatus 1 includes a fluidic network, or in other words, a piping or conduit network having inlet branches 10 and 12, an intermediate branch 14, and a recycle loop 16. Inlet branches 10 and 12 merge into intermediate branch 14. As a result component streams (which for illustrative purposes only consist of an aqueous ammonia solution and de-ionized "DI" water) as liquid components of the desired liquid mixture stream are mixed to form the first intermediate mixture. Within intermediate branch 14, a stream containing the specified component (in this illustration ammonia) is introduced into the first intermediate mixture stream to form a second intermediate mixture stream, the second intermediate mixture stream is then blended to form a third intermediate mixture stream which enters recycle loop 16, part of which discharges as a product stream 18.

Inlet branches 10 and 12 are provided with isolation valves 20 and 22 to manually cut off the flow of the component streams. In order to control pressure within the inlet branches 20 and 22, a pressurized nitrogen source acts upon a pilot pressure regulator 24 which in turn controls a pressure within inlet branches 20 and 22 by dome loaded pressure regulators 26 and 28.

When production of the two component mixtures is not required, remotely activated cut-off valves 30 and 32 can be activated (in a manner discussed hereinafter) to assume a closed position and thereby cut off the flow within inlet branches 10 and 12. During production of the two component mixture, remotely activated cut-off valves 30 and 32 are set in the open position. Preferably, remotely activated cut-off valves are air operated and are normally in the closed position. In this regard, isolation valves 20 and 22 are valves of the type that are normally set in the open position.

In order to prevent backflow of liquid, check valves 34 and 36 are provided, Rotometers 38 and 40 set flow rate of the ammonia water and the DI water so that first intermediate mixture stream is a slightly lower concentration than is desired in the product stream 18. Intermediate branch 14 is provided with an inlet 19 to which the specified component is added to bring concentration of the specified component in the first intermediate mixture stream up to the predetermined concentration of the specified component. Thus, after inlet 19, the first intermediate mixture stream becomes a second intermediate mixture stream that is blended in for instance static mixer 42 to produce a third intermediate mixture stream.

The concentration of specified component within the third intermediate mixture stream can be sensed in a manner that is appropriate to the liquid mixture being engaged. In the example of an ammonia solution, the ammonia concentration can be indirectly sensed by sensing the conductivity of the third intermediate mixture stream by means of a conductivity cell 44 known in the art. Conductivity cell 44 produces an electrical conductivity signal that is fed to a controller 46 by way of an electrical connection 48. It is to be noted that controller 46 can be any one of a number of programmable digital controllers that are readily available and known in the art. In the event that the concentration of the third intermediate mixture stream is too low, a metering pump 50 connected to inlet 60 introduces liquid into intermediate branch 14. To this end, metering pump is connected to controller 46 by an electrical connection 52.

Liquid for metering pump 50 is drawn from reservoir 54 which is connected to inlet branch 10 by a conduit 56. The flow of liquid is controlled by a control valve 57, again preferably air operated and set in the normally closed position, by controller 46. To this end, control valve 57 is connected to controller 46 by way of an electrical connection 58. Control valve 57 is activated in response to liquid level as sensed by a set of level detectors 60, 62 64 and 66. Level detectors 60–66 are connected to controller 46 by way of an electrical conduit 68. In this regard, level detectors 62 and 64 are high and low level detectors. The high level detector 62 triggers valve 57 to assume a closed position for refill purposes and the low level detector 64 triggers valve 57 to assume a closed position when reservoir 54 is filled. Level detectors 60 and 66 are extreme high and low level detectors. The detection of liquid by either of these aforementioned level detectors will cause a system shutdown.

Recycle loop 16 is provided with an inlet junction 70 and an outlet junction 72 from which product stream discharges. Product stream 18 is produced by a mixture stream that is formed by introducing a recycle stream in recycle leg 74 of recycle loop 16. As is apparent, the recycle stream has the same make-up as the product stream 18. It mixes with the third intermediate product stream to form a liquid mixture stream at inlet junction 70. The liquid mixture stream is then pumped by way of a pump 76 into a pressure vessel 73. Recycle loop 16 is additionally provided with isolation valves 78 and 80 set in the normally open position to cut-off the flow to and from pump 76. The liquid mixture stream flows to a three way valve 82 which is remotely activated (preferably pneumatic) that is designed to either route the flow to drain or to a check valve 84 and then into pressure vessel 73. The drain function may be used for flushing the system. It may also be used for checking the make-up of the two component liquid stream used in forming the product stream to make certain that the product stream will have the requisite concentration of the specified component.

The liquid level within pressure vessel 73 is sensed by level detectors 86, 88, 90 and 92. These aforementioned level detectors are connected again to controller 46 by an electrical conduit 94. In response to high and low level liquid detection by level detectors 88 and 90, controller 46 controls remotely activated valves 30 and 32 by way of electrical connections 96 and 98, respectfully, to ensure that pressure vessel 73 remains filled. Thus, liquid mixture is only made, intermittently, when the liquid level within pressure vessel 73 drops below low level detector 90. Level detectors 86 and 92 are extreme high and low level detectors that are used to trigger system shutdown.

As a result of the foregoing, the concentration of product stream 18 is controlled so that its concentration does not vary very much over time. For instance, assuming that the concentration of the specified component being introduced into inlet branch 10 decreases, its concentration can be immediately brought up by metering pump 50 to the desired concentration. However the liquid within third intermediate mixture stream would temporarily be below the required concentration. However, a slight variation in concentration would have little effect on the concentration of product stream 18 because its concentration would be brought up by recycle stream 74. The variation in concentration would only be slightly reflected in the concentration of product stream 18 and then only for a very short time interval.

While the present invention has been described with reference to preferred embodiment, as will occur to those skilled in the art, numerous changes, additions and omissions may be made without departing from the spirit and scope of the present invention.

We claim:

1. An apparatus for producing a product stream having a liquid mixture with a predetermined concentration of a specified component, said apparatus comprising:

a fluidic network, comprising:

two inlet branches in flow communication to mix component streams, at least one of said inlet branches containing said specified component to form a first intermediate mixture stream having a lower concentration of said specified component than said predetermined concentration;

remotely activated cut-off valves within said inlet branches of said fluidic network, said cut-off valves being operable to assume open and closed positions;

an intermediate branch having an inlet to introduce a stream of said specified component into said first intermediate mixture stream to form a second intermediate mixture stream;

means for blending said second intermediate mixture stream to produce a third intermediate mixture stream; and a recycle loop, comprising:

an inlet junction connected to said intermediate branch, an outlet junction in flow communication with an outlet to discharge a product stream, and a recycle leg communicating between said inlet junction and said outlet junction thereby to introduce a recycle stream into said third intermediate stream to form a liquid mixture stream, said liquid mixture stream dividing at said outlet junction to form said recycle stream and said product stream thereby continually recycling a part of said liquid mixture stream into said third intermediate stream while the product stream is being discharged;

a pump located within said recycle loop to pump said liquid mixture stream;

a pressure vessel in communication with said pump;

means for sensing the liquid level within said pressure vessel;

a controller responsive to said liquid level sensing means, said controller connected to said remotely activated cut-off valves and adapted to control said valves to be open when the liquid level in said pressure vessel rises to a high level;

means for measuring the concentration of said specified component within said third intermediate mixture stream; and means for metering said introduction of said stream of said specified component into said first intermediate mixture stream so that said third intermediate mixture stream contains said specified component in said predetermined concentration.

2. The apparatus in accordance with claim 1, further comprising:

a reservoir for said specified component stream, wherein said metering means comprises:

a metering pump connected to said inlet of said intermediate branch to pump said specified component stream from said reservoir into said first intermediate mixture stream, and another controller responsive to said third intermediate mixture stream specified component concentration measuring means to control said metering pump so that the concentration of said specified component within said third intermediate mixture stream is about said predetermined concentration.

3. The apparatus in accordance with claim 2, wherein said measuring means for said third intermediate mixture stream specified component concentration comprises: a conductivity sensor; and said second intermediate mixture stream blending means comprises: a static mixer for blending said second intermediate mixture stream.

4. The apparatus in accordance with claim 1, wherein said measuring means for said third intermediate mixture stream specified component concentration comprises: a conductivity sensor; and said second intermediate mixture stream blending means comprises: a static mixer for blending said second intermediate mixture stream.

5. The apparatus for producing a product stream having a liquid mixture with a predetermined concentration of a specified component, said apparatus comprising:

a fluidic network, comprising:

two inlet branches in flow communication to mix component streams, at least one of said inlet branches containing said specified component to form a first intermediate mixture stream having a lower concentration of said specified component than said predetermined concentration;

an intermediate branch having an inlet to introduce a stream of said specified component into said first intermediate mixture stream to form a second intermediate mixture stream;

means for blending said second intermediate mixture stream to produce a third intermediate mixture stream;

a recycle loop comprising:

an inlet junction connected to said intermediate branch, an outlet junction in flow communication with an outlet to discharge a product stream, and a recycle leg communicating between said inlet junction and said outlet junction thereby to introduce a recycle stream into said third intermediate stream to form a liquid mixture stream, said liquid mixture stream dividing at said outlet junction to form said recycle stream and said product stream thereby continually recycling a part of said liquid mixture stream into said third intermediate stream while the product stream is being discharged;

means for measuring the concentration of said specified component within said third intermediate mixture stream;

means for metering said introduction of said stream of said specified component into said first intermediate mixture stream so that said third intermediate mixture stream contains said specified component in said predetermined concentration;

a reservoir for said specified component stream;

wherein said specified component metering means comprises:

a metering pump connected to said inlet of said intermediate branch to pump said specified component stream from said reservoir into said first intermediate mixture stream, and a controller responsive to said third intermediate mixture stream specified component concentration measuring means to control said metering pump so that the concentration of said specified component within said third intermediate mixture stream is about said predetermined concentration.

6. The apparatus in accordance with claim 5, further comprising:

remotely activated cut-off valves within said inlet branches of said fluidic network, said cut-off valves being operable to assume open and closed positions;

a pump located within said recycle loop to pump said liquid mixture stream;

a pressure vessel in communication with said pump;

means for sensing the liquid level within said pressure vessel; and a controller responsive to said liquid level sensing means, said controller connected to said remotely activated cut-off valves and configured to control said valves such that they assume the open position when the liquid level in said pressure vessel rises to a high level.

7. The apparatus in accordance with claim 6, wherein said third intermediate mixture stream specified component concentration measuring means comprises: a conductivity sensor; and said second intermediate mixture steam blending means comprises: a static mixture.

8. The apparatus in accordance with claim 5, wherein said measuring means for said third intermediate mixture stream specified component concentration comprises: a conductivity sensor; and said second intermediate mixture stream blending means comprises: a static mixer for blending said second intermediate mixture stream.

\* \* \* \* \*